US012158260B2

(12) United States Patent
Zhang et al.

(10) Patent No.: US 12,158,260 B2
(45) Date of Patent: Dec. 3, 2024

(54) LAMP CONTROL BOX AND LAMP

(71) Applicant: Shenzhen Torshare Technology Co., Ltd., Guangdong (CN)

(72) Inventors: Houkun Zhang, Guangdong (CN); Mantie Li, Guangdong (CN); Jian Peng, Guangdong (CN); Shanglong Wu, Guangdong (CN); Liang Chen, Guangdong (CN); Huilong Zhang, Guangdong (CN)

(73) Assignee: SHENZHEN TORSHARE TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 18/078,227

(22) Filed: Dec. 9, 2022

(65) Prior Publication Data

US 2023/0184419 A1 Jun. 15, 2023

(30) Foreign Application Priority Data

Dec. 9, 2021 (CN) ......................... 202111503417.6
Dec. 9, 2021 (CN) ......................... 202123088513.7

(51) Int. Cl.
*F21V 23/00* (2015.01)
*F21V 23/04* (2006.01)
(Continued)

(52) U.S. Cl.
CPC .......... *F21V 23/007* (2013.01); *F21V 23/045* (2013.01); *F21V 23/06* (2013.01); *H05B 47/19* (2020.01)

(58) Field of Classification Search
CPC ...... F21V 23/007; F21V 23/045; F21V 23/06; F21V 23/008; H05B 47/19; H05B 45/20
See application file for complete search history.

(56) References Cited

U.S. PATENT DOCUMENTS 9,482,418 B2 * 11/2016 Zeng ..................... F21V 17/101
11,363,687 B2 * 6/2022 Hayman ................ H05B 45/48
(Continued)

FOREIGN PATENT DOCUMENTS

CN 103390335 A 11/2013
CN 204045865 U 12/2014
(Continued)

OTHER PUBLICATIONS

First Office Action dated Jul. 8, 2023 received in Chinese Patent Application No. CN 202111503417.6.

*Primary Examiner* — Raymond R Chai
(74) *Attorney, Agent, or Firm* — Scully, Scott, Murphy & Presser, P.C.

(57) ABSTRACT

A lamp control box and a lamp are provided. The box includes a power color temperature control board, electrically coupled to at least one light of a lamp body of the lamp, with a plurality of power setting levels and color temperature setting levels; a power color temperature control board for generating a corresponding power level trigger signal according to the power setting levels selected and triggered by the user, and adjusting the color temperature of the lamp body according to the color temperature level selected and triggered by the user; a power control board, electrically coupled to the at least one light and the power color temperature control board respectively, and the power control board is configured to output the corresponding power to the at least one light according to the power level trigger signal.

19 Claims, 8 Drawing Sheets

(51) Int. Cl.
*F21V 23/06* (2006.01)
*H05B 47/19* (2020.01)

(56) References Cited

U.S. PATENT DOCUMENTS

| | | | | |
|---|---|---|---|---|
| 2012/0218764 | A1* | 8/2012 | Williamson | F21K 9/00 362/294 |
| 2015/0351187 | A1* | 12/2015 | McBryde | H05B 45/20 315/185 R |
| 2017/0234517 | A1* | 8/2017 | Highbridge | F21V 21/30 362/427 |
| 2017/0307203 | A1* | 10/2017 | Roh | H05B 45/10 |
| 2019/0063730 | A1* | 2/2019 | O'Brien | F21K 9/68 |
| 2019/0075634 | A1* | 3/2019 | Cho | F21V 23/045 |
| 2019/0312396 | A1* | 10/2019 | Kohen | H01R 13/7038 |
| 2020/0018469 | A1 | 1/2020 | Kohen | |
| 2020/0120775 | A1* | 4/2020 | Doheny | H05B 45/12 |
| 2020/0348000 | A1* | 11/2020 | Bailey | F21V 23/006 |
| 2020/0375015 | A1* | 11/2020 | Carrigan | H05B 47/199 |
| 2021/0136888 | A1* | 5/2021 | Vasquez | F21V 23/06 |
| 2021/0321499 | A1* | 10/2021 | Hayman | H05B 45/20 |
| 2022/0003399 | A1* | 1/2022 | Kohen | F21V 23/0442 |
| 2023/0308093 | A1* | 9/2023 | Chen | H05B 47/13 |

FOREIGN PATENT DOCUMENTS

| | | | |
|---|---|---|---|
| CN | 108826165 | A | 11/2018 |
| CN | 110661340 | A | 1/2020 |
| CN | 110671617 | A | 1/2020 |
| CN | 211959611 | U | 11/2020 |

* cited by examiner

LAMP CONTROL BOX AND LAMP

TECHNICAL FIELD

The present disclosure relates to the fields of lighting, and in particular to a lamp control box and a lamp.

BACKGROUND

As people's living standards improve, the needs are becoming more and more diversified, the function of LED lights are becoming more and more diverse. However, multiple functions of LED lights can not be compatible, a variety of protrudes are designed to meet the different needs of people, which raises the production costs.

SUMMARY

The main purpose of the present disclosure is to propose a lamp control box and a lamp, aiming to solve a problem of single function of the lamp and improve a compatibility of the lamp.

To achieve the above purpose, a first aspect of the present disclosure provides a lamp control box, applied to a lamp including a lamp body which includes at least one light. The lamp control box includes a power color temperature control board, electrically coupled to the at least one light of the lamp, having a plurality of power setting levels and color temperature setting levels; and a power supply control board, electrically coupled to the at least one light and the power color temperature control board respectively; the power color temperature control board is configured for generating a corresponding power level trigger signal in response to one of the plurality of power setting levels being selected and triggered by a user; the power supply control board is configured for receiving electric power output from the lamp, and adjusting power level of the power output from the lamp in response to the power level trigger signal, and outputting the adjusted electric power to the at least one light; the power color temperature control board is further configured for adjusting color temperature of the at least one light according to one of the plurality of the color temperature setting levels being selected and triggered by the user.

Optionally, the power color temperature control board includes: a first circuit board, a power setting dip switch and a color temperature setting dip switch. The power setting dip switch is set on the first circuit board and coupled to the power supply control board; the power setting dip switch is configured to generate the corresponding power level trigger signal when the corresponding level is selected and triggered by a user to adjust the power level output to the at least one light. The color temperature setting dip switch is set on the first circuit board and coupled to the power supply control board; the color temperature setting dip switch is configured to adjust the color temperature of the at least one light to the corresponding color temperature according to the color temperature setting level selected and triggered by the user.

Optionally, the lamp control box further includes an intelligent module; the intelligent module is electrically coupled to the power supply control board; the intelligent module is configured for achieving wireless communication between an external device and the power supply control board and enabling the power supply control board to control the at least one light to work according to control signals sent by the external device; the intelligent module is also configured for collecting external environmental signals and enabling the power supply control board to control the lamp body at least one light to work according to the external environmental signals.

Optionally, the intelligent module is pluggable electrically coupled to the power supply control board.

Optionally, the intelligent module includes a conductive plug; the power supply control board defines a conductive plughole; the conductive plug is plugged into and coupled to the conductive plughole so that the intelligent module and the power supply control board are removably and electrically coupled to each other.

Optionally, the intelligent module includes: a second circuit board, a wireless communication circuit and/or a sensor. The second circuit board is further provided with an electrical connector. The wireless communication circuit, is provided on the second circuit board. The wireless communication circuit is electrically coupled to the power supply control board through the electrical connector. The sensor is provided on the second circuit board. The sensor is electrically coupled to the power supply control board through the electrical connector.

Optionally, the intelligent module further includes: a bottom base, the bottom base defines a groove, the second circuit board is accommodated in the groove.

Optionally, the lamp control box includes a box; the power color temperature control board, the power supply control board and the intelligent module are received in the box.

Optionally, the box includes a power supply box, and a bottom housing. The power supply control board is received in the power supply box. The power supply box defines an opening. The bottom housing covers on the opening of the power supply box. The bottom housing defines a receiving space. The power color temperature control board and the intelligent module are received in the receiving space of the bottom housing.

Optionally, the bottom housing further includes an annular support part; a bottom wall of the bottom housing includes a threaded fixing portion for the intelligent module to be threadedly coupled to the annular support part of the bottom housing.

Optionally, the bottom housing further includes an annular support part; the intelligent module includes a conductive plug post; the power supply control board defines a conductive plughole; the conductive plughole is coupled to the annular support part, the conductive plug post is plugged and coupled to the conductive plughole so that the intelligent module and the power supply control board are detachably and electrically coupled to each other.

Optionally, the power color temperature control board includes a power setting dip switch and a color temperature setting dip switch; the conductive plughole is an intelligent interface attached to the annular support part; the intelligent interface, the power setting dip switch and the color temperature setting dip switch are located on the annular support part.

Optionally, the power color temperature control board includes a power setting dip switch and a color temperature setting dip switch; the conductive plughole is an intelligent interface attached to the annular support part; the intelligent interface is set on the annular support part; the power setting dip switch and color temperature setting dip switch are set on a side wall of the power supply box.

Optionally, the power color temperature control board includes a power setting dip switch and a color temperature setting dip switch, the power setting dip switch and color temperature setting dip switch are set on a side wall of the power supply box.

Optionally, the power supply box has a cylindrical shape or a square shape.

Optionally, the number of the intelligent modules is multiple, and multiple intelligent modules are pluggable electrically connected to the power supply control board.

To achieve the above purpose, a second aspect of the present disclosure further provides a lamp, the lamp includes a lamp body and a lamp control box as described above; the lamp body includes at least one light, the lamp control box is electrically coupled to the at least one light.

By integrating the power color temperature control board and power supply control board in the lamp control box, by using the power color temperature control board, the present disclosure can achieve to set different power setting levels and different color temperature setting levels, solving the problem of single function of the lamp and achieving the purpose of compatibility. The detachable electric connection between the lamp control box and the at least one light of the present disclosure can be applied to different lamp bodies; different power levels can be adjusted according to different lamp bodies, which can improve the compatibility between the lamp control box and different lamp bodies. The lamp control box of the present disclosure can be widely configured in different lamp drives.

BRIEF DESCRIPTION OF THE DRAWINGS

In order to more clearly illustrate the technical solutions in the embodiments or prior art of the present disclosure, the following is a brief description of the accompanying drawings that need to be used in the description of the embodiments or prior art, it will be obvious that the accompanying drawings in the following description are only some embodiments of the present disclosure. For those of ordinary skill in the art, other drawings may be obtained from the structure illustrated in these drawings without any creative effort.

DESCRIPTION OF THE ACCOMPANYING FIGURE MARKERS

Figure 1:
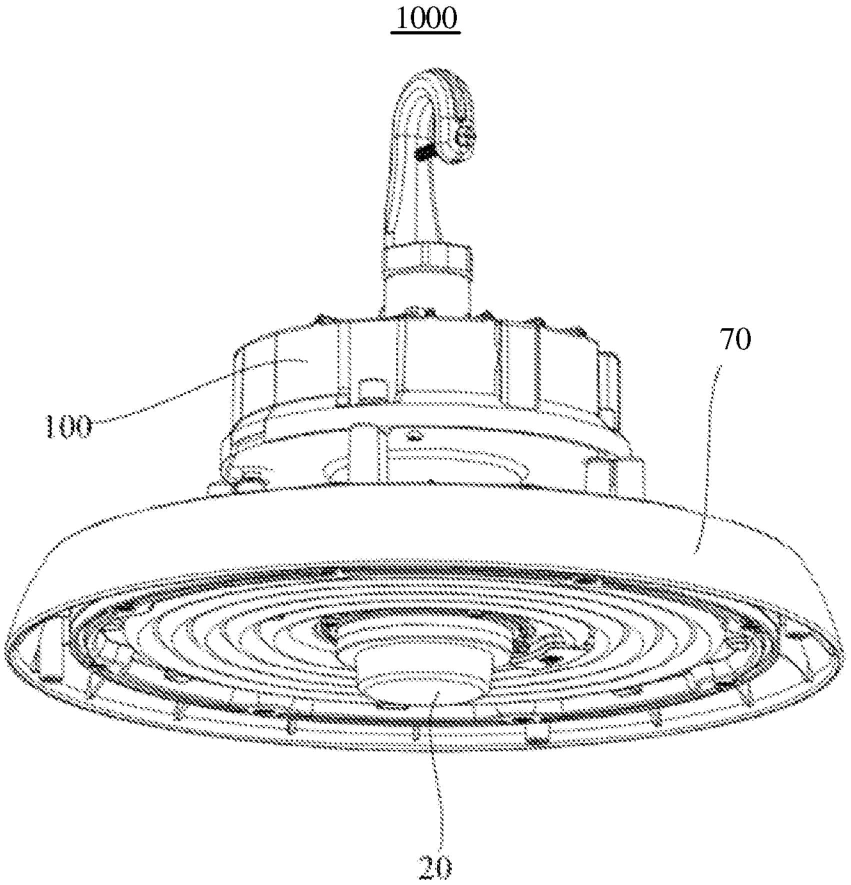
FIG. 1 is a structural schematic diagram of a lamp control box of the present disclosure applied to one embodiment of a lamp.

| Label | Name | Label | Name |
|---|---|---|---|
| 1000 | Lamp | 100 | Lamp control box |
| R1~R6 | First resistor~Sixth resistor | 10 | power color temperature control board |
| C1 | First capacitor | 20 | power control board |
| D1 | First diode | 30 | Intelligent module |
| Q1 | First electronic switch | 31 | Second circuit board |
| WW- | First color temperature lamp bead | 32 | Bottom base |
| CW- | Second color temperature lamp bead | 33 | Threaded fixing portion |
| SW1 | power setting dip switch | 40 | Annular support part |
| 70 | Lamp body | 60 | Waterproof cover |
| 80 | Lamp control circuit | 11 | First circuit board |
| 101 | Box | 1011 | power supply box |
| 1012 | Opening | 1013 | Bottom housing |
| 1014 | Receiving space | 321 | Groove |
| 35 | Electrical connector | 36 | Wireless communication circuit |
| 37 | Sensor | 34 | Conductive plug post |

The realization of the purpose, functional features and advantages of the present invention will be further described with reference to the accompanying drawings in conjunction with the embodiments.

DETAILED DESCRIPTION OF THE EMBODIMENTS

The technical solutions in the embodiments of the present disclosure will be clearly and completely described below with reference to the accompanying drawings in the embodiments of the present disclosure. It is clear that the described embodiments are only a part of the embodiments of the present disclosure, and not all of them. Based on the embodiments in the present disclosure, all other embodiments obtained by a person of ordinary skill in the art without making creative labor fall within the protection scope of the present disclosure.

It should be noted that if there are embodiments of the present disclosure involving directional indications (such as up, down, left, right, forward, back), the directional indications are used only to explain the relative position relationship, movement, etc. between the parts in a particular attitude (as shown in the attached drawings), and if the specific attitude changes, the directional indication changes accordingly In addition, if there is a description of "first", "second", etc. in an embodiment of the present disclosure, the description of "first", "second", etc. is used only for the description of the first, second, etc. The description of "first", "second", etc. is used only for descriptive purposes and is not to be understood as indicating or implying its relative importance or implicitly specifying the number of indicated technical features. Thus, features qualified with "first" and "second" may explicitly or implicitly include at least one such feature. In addition, the technical solutions between the various embodiments can be combined with each other, but must be based on the ordinary skilled person in the field can achieve, when the combination of technical solutions appear to contradict each other or can not be achieved should be considered that such a combination of technical solutions does not exist, and is not within the scope of protection of the invention requirements.

The present disclosure proposes a lamp 1000.

Figure 2:
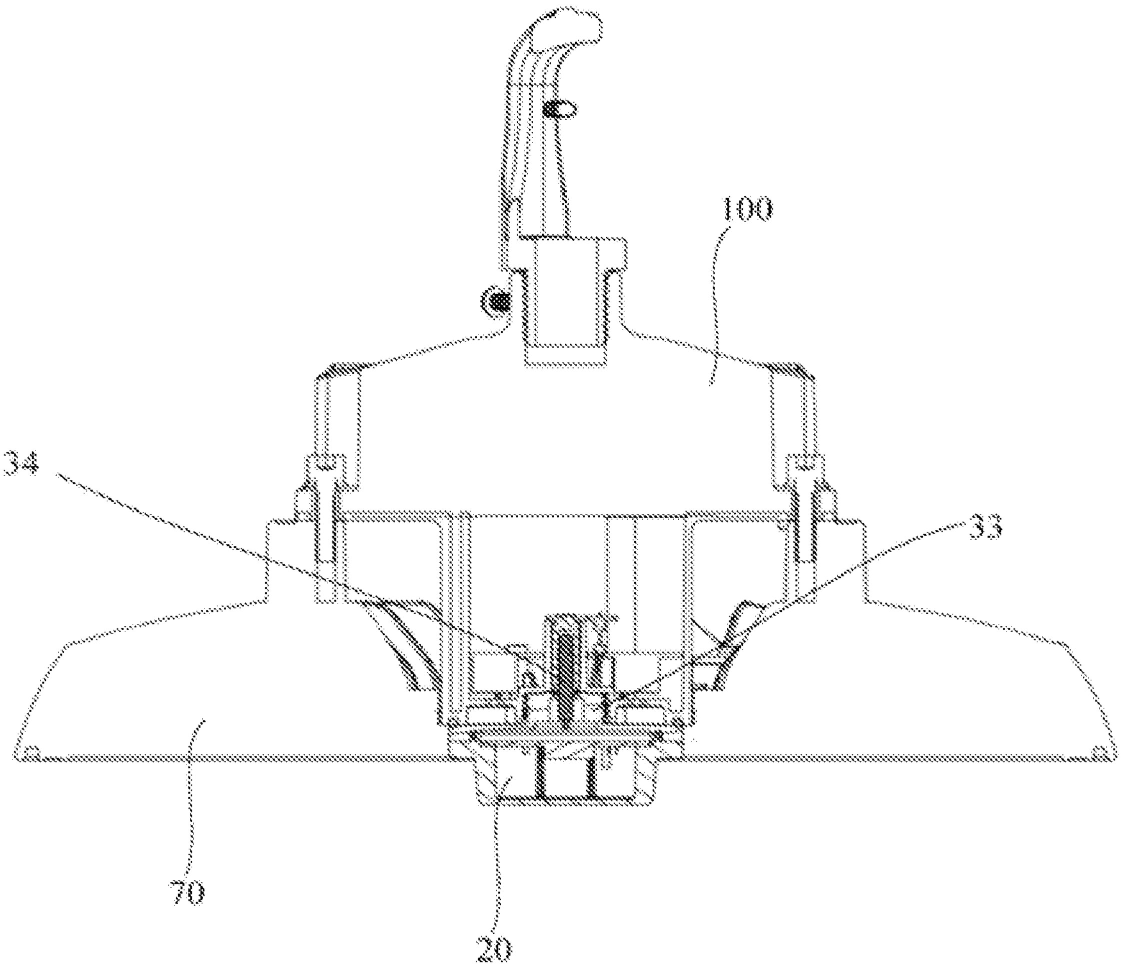
FIG. 2 is a cross-sectional schematic diagram of the lamp according to one embodiment of the present disclosure.

As shown in FIGS. 1 and 2, the lamp 1000 includes a lamp body 70 and a lamp control box 100; the lamp control box 100 is electrically coupled to the lamp body 70.

As shown in FIGS. 1 and 2, the lamp 1000 includes a lamp body 70 and a lamp control box 100; the lamp body 70 includes at least one light, the lamp control box 100 is electrically coupled to the at least one light.

Figure 3:
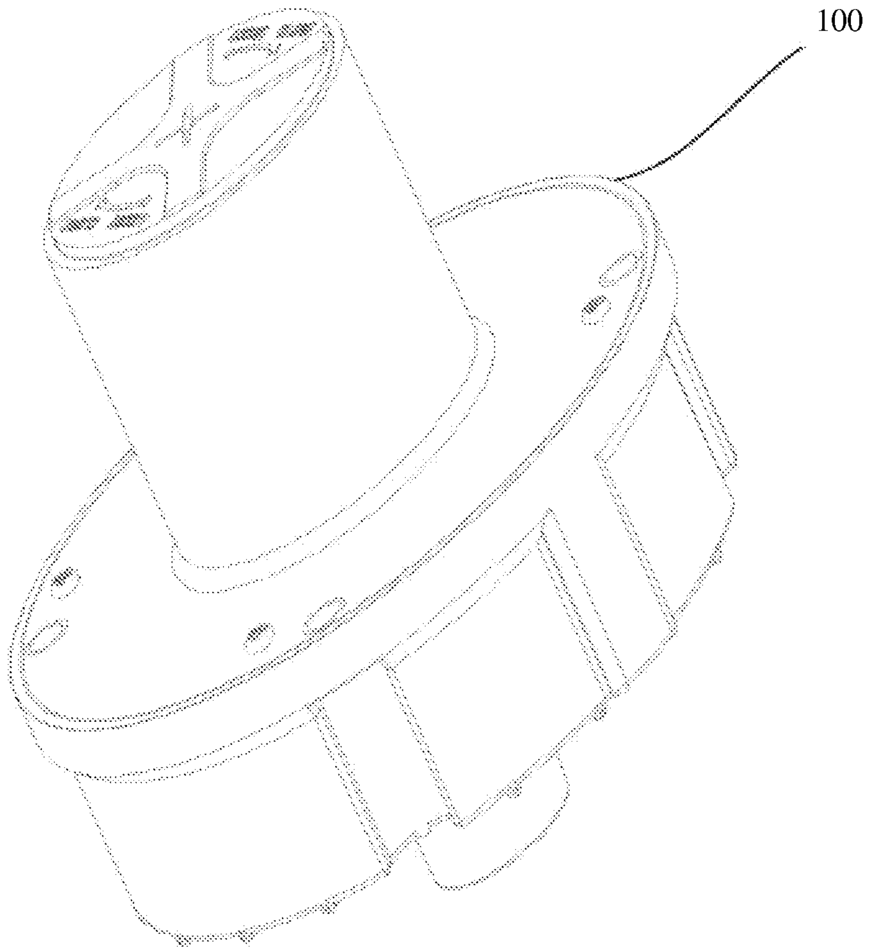
FIG. 3 is a structural schematic diagram of the lamp control box according to one embodiment of the present disclosure.
Figure 4:
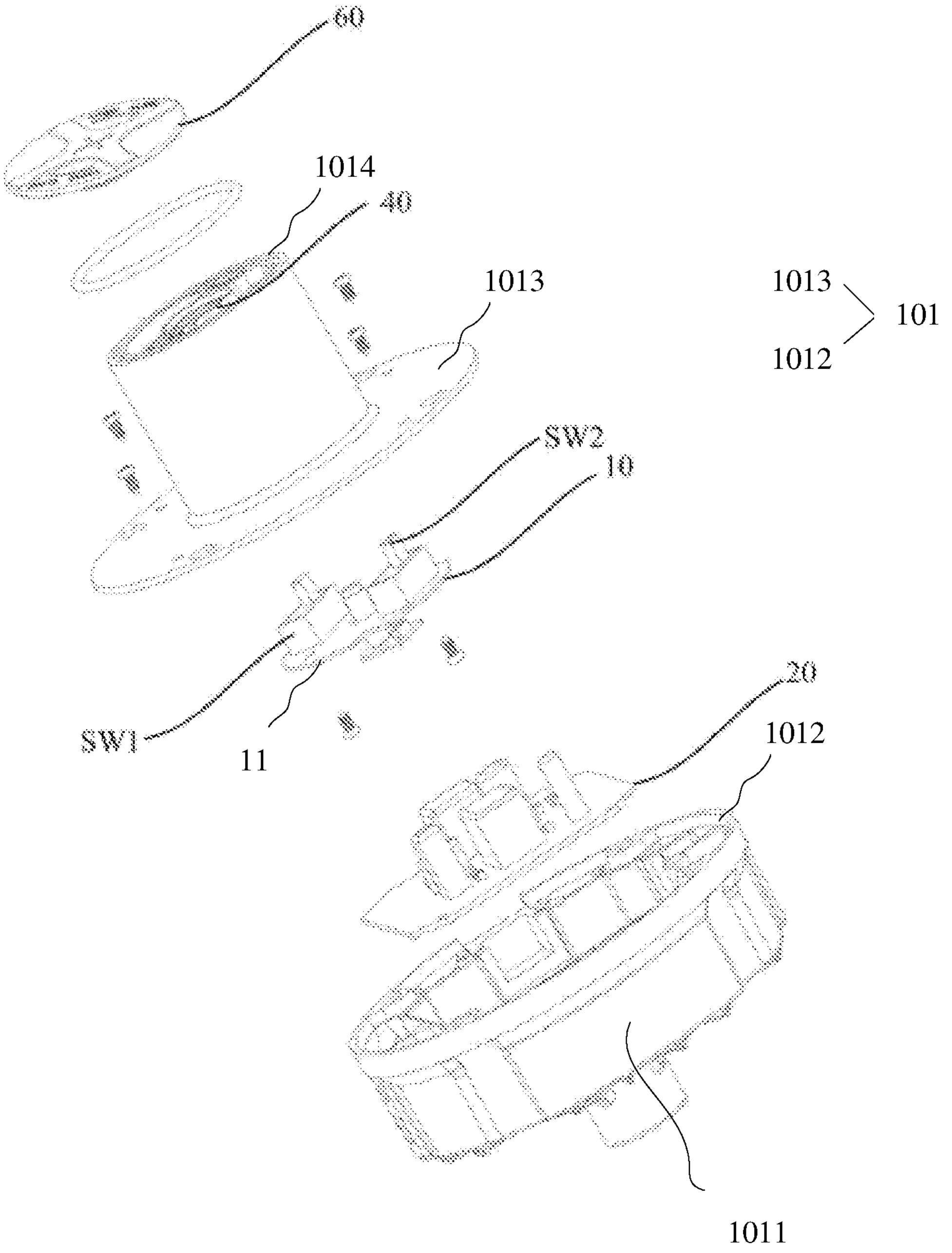
FIG. 4 is an exploded schematic diagram of the lamp control box according to one embodiment of the present disclosure.
Figure 5:
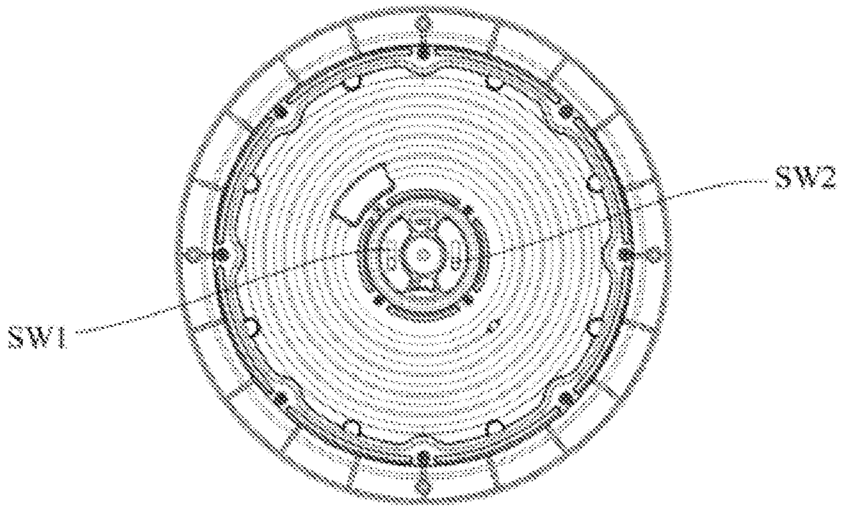
FIG. 5 is a schematic diagram of the lamp from another view according to one embodiment of the present disclosure.

As shown in FIGS. 3 to 5, in at least one embodiment of the present disclosure, the lamp control box 100 includes a power color temperature control board 10 and a power supply control board 20. The power color temperature control board 10 is electrically coupled to the at least one light. The power color temperature control board 10 includes a plurality of power setting levels and a plurality of color temperature setting levels. The power color temperature control board 10 is configured for generating a corresponding power level trigger signal in response to one of the plurality of power setting levels being selected and triggered by a user. The power supply control board 20 is configured for receiving electric power output from the lamp 1000, and adjusting power level of the electric power output from the power source in response to the power level trigger signal and outputting the adjusted electric power to the at least one light. The power color temperature control board 10 is further configured for adjusting color temperature of the lamp body 70 according to one of the plurality of the color temperature setting levels being selected and triggered by the user.

Thereby, the lamp 1000 can output corresponding power level trigger signal to the power supply control board 20 by selecting different power levels on the power color temperature control board 10, or output corresponding color temperature signal to color temperature lamp bead by selecting different color temperature levels. The power supply control board 20 receives corresponding power level trigger signal, and adjusts the power levels of the electric power output by the lamp 1000, and outputs the adjusted electric power to the at least one light, thereby achieving the function of adjusting the power level of the electric power output by the lamp 1000. Different color temperature lamp beads will be lit after receiving the color temperature levels, thereby achieving the function of adjusting color temperature.

In this embodiment, the at least one light can be but not limited to LED lights. The power color temperature control board 10 can be switched to different power setting levels; different power setting levels corresponds to different power level trigger signals. The power setting level can have high, medium and low three power levels. When the power color temperature control board 10 is switched to high power setting level, the power circuit outputs high power level trigger signal to the power supply control board 20, so as to adjust the electric power output to the at least one light. When the power color temperature control board 10 is switched to medium power setting level, the power circuit outputs medium power level trigger signal to the power supply control board 20, so as to adjust the electric power output to the at least one light. When the power color temperature control board 10 is switched to low power setting level, the power circuit outputs lower power level trigger signal to the power supply control board 20, so as to adjust the electric power output to the at least one light. The power supply control board 20 will output the corresponding electric power to at least one light after receiving different power level trigger signals from the power circuit. For example, the power supply control board 20 will output the high electric power to the at least one light after receiving the high power level trigger signal from the power color temperature control board 10. The power supply control board 20 will output the medium electric power to the at least one light after receiving the medium power level trigger signal from the power color temperature control board 10. The power supply control board 20 will output the low electric power to the at least one light after receiving the low power level trigger signal from the power color temperature control board 10. Therefore, the electric power can be adjusted by controlling multiple power setting levels on the first circuit board 11, and the color temperature can be adjusted by controlling multiple color temperature setting levels on the first circuit board 11.

As shown in FIG. 4, in one embodiment, the power color temperature control board 10 also includes a first circuit board 11, a power setting dip switch SW1 and a color temperature setting dip switch SW2. The power setting dip switch SW1 is set on the first circuit board 11 and coupled to the power supply control board 20. The power setting dip switch SW1 is configured to generate the corresponding power level trigger signal when being selected and triggered by the user. The color temperature setting dip switch SW2 is set on the first circuit board 11 and coupled to the power supply control board 20. The color temperature setting dip switch SW2 is configured to adjust the color temperature of the at least one light to the corresponding color temperature according to the color temperature level being selected and triggered by the user. In one embodiment, the power setting dip switch SW1 and color temperature setting dip switch SW2 can be toggled by the user to adjust the power level and color temperature level respectively; the user can select the corresponding power level and color temperature level according to the actual application requirements. The power setting dip switch SW1 is set on the first circuit board 11 and connected to the power supply control board 20, the user can switch to the corresponding power setting level by controlling the power setting dip switch SW1 on the first circuit board 11, and the power setting dip switch SW1 will generate the power level trigger signal corresponding to the selected power setting level. The color temperature setting dip switch SW2 is set on the first circuit board 11 and connected to the power supply control board 20. The user can switch to the corresponding color temperature setting level by controlling the color temperature setting dip switch SW2 on the first circuit board 11, and the color temperature setting dip switch SW2 will adjust the at least one light to the corresponding color temperature according to the corresponding color temperature setting level. In this example, the color temperature setting dip switch SW2 of the power color temperature control board 10 switches to different color temperature setting levels, different color temperature setting levels correspond to different color temperatures. The color temperature can be red and yellow color temperature. When the color temperature setting dip switch SW2 is switched to the red temperature setting level, the power color temperature control board 10 adjusts the color temperature of the at least one light to red; when the color temperature setting dip switch SW2 is switched to the yellow temperature setting level, the power color temperature control board 10 adjusts the color temperature of the at least one light to yellow; when the color temperature setting dip switch SW2 is switched to no color temperature level, the power color temperature control board 10 adjusts the color temperature of the at least one light to be white.

Figure 6:
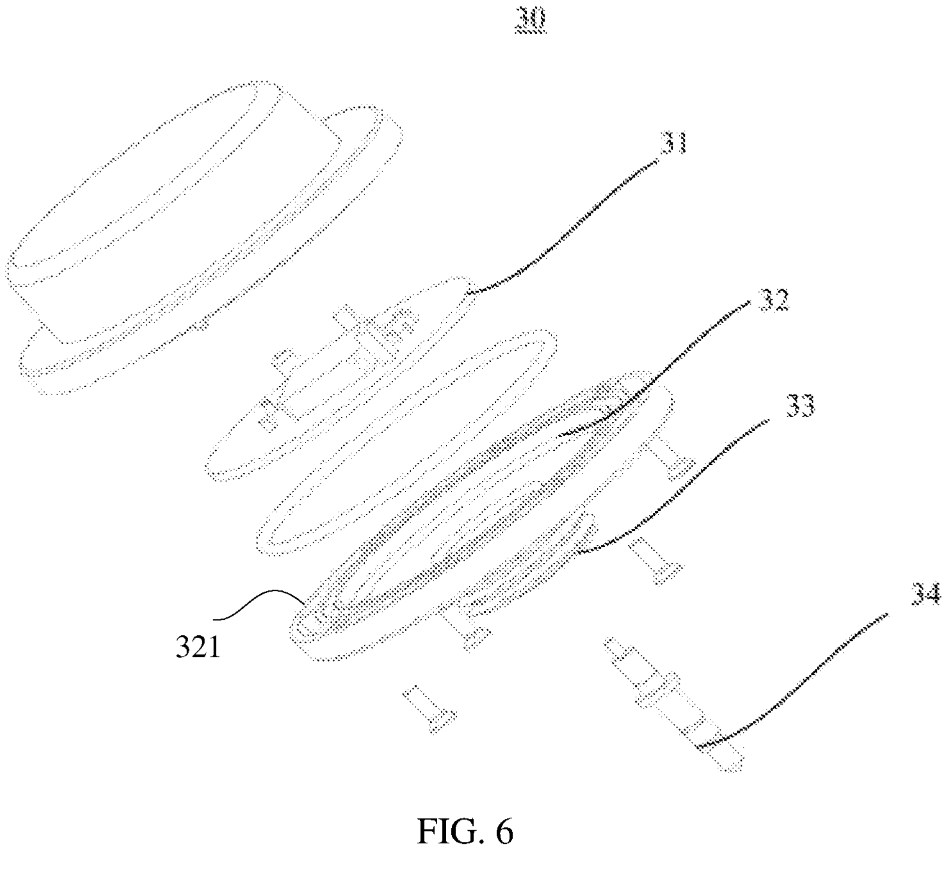
FIG. 6 is an exploded schematic diagram of an intelligent module according to one embodiment of the present disclosure.
Figure 7:
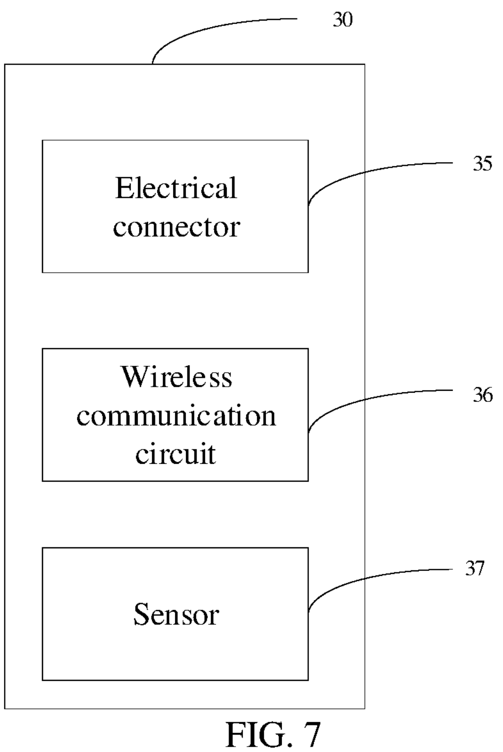
FIG. 7 is a module schematic diagram of the intelligent module according to one embodiment of the present disclosure.

As shown in FIGS. 6 and 7, the lamp control box 100 further includes an intelligent module 30. The intelligent module 30 is electrically coupled to the power supply control board 20. The intelligent module 30 is configured to achieve wireless communication between an external device and the power supply control board 20 so that the power supply control board 20 controls the at least one light to work according to control signals sent by the external device. The intelligent module 30 is also configured to collect external environmental signals and enable the power supply control board 20 to control the at least one light to work according to the external environmental signals.

Thereby, by connecting the adapted intelligent module 30, the regulation and control function of the at least one light can be achieved As shown in FIGS. 6 and 7, in one embodiment, the intelligent module 30 includes a second circuit board 31 and a wireless communication circuit 36. The second circuit board 31 is further provided with an electrical connector 35. The wireless communication circuit 36 is provided on the second circuit board 31. The wireless communication circuit 36 is electrically coupled to the power supply control board 20 through the electrical connector 35.

In this embodiment, the second circuit board 31 of the intelligent module 30 is provided with the electrical connector 35. The wireless communication circuit 36 on the second circuit board 31 is electrically coupled to the power supply control board 20 through the electrical connector 35, and the user can then realize the control function of the at least one light through the intelligent module 30.

In at least one embodiment, the intelligent module 30 further includes a sensor 37. The sensor 37 is provided on the second circuit board 31. The sensor 37 is electrically coupled to the power supply control board 20 through the electrical connector 35.

It is understood that the intelligent module 30 can be electrically coupled to the power supply control board 20 so as to achieve wireless communication between the external device and the power supply control board 20. The power supply control board 20 can control the at least one light to achieve the corresponding function according to the corresponding control signal sent to the external device, which function can be to control the brightness of the at least one light or to control the switching time of the at least one light, etc.

Figure 8:
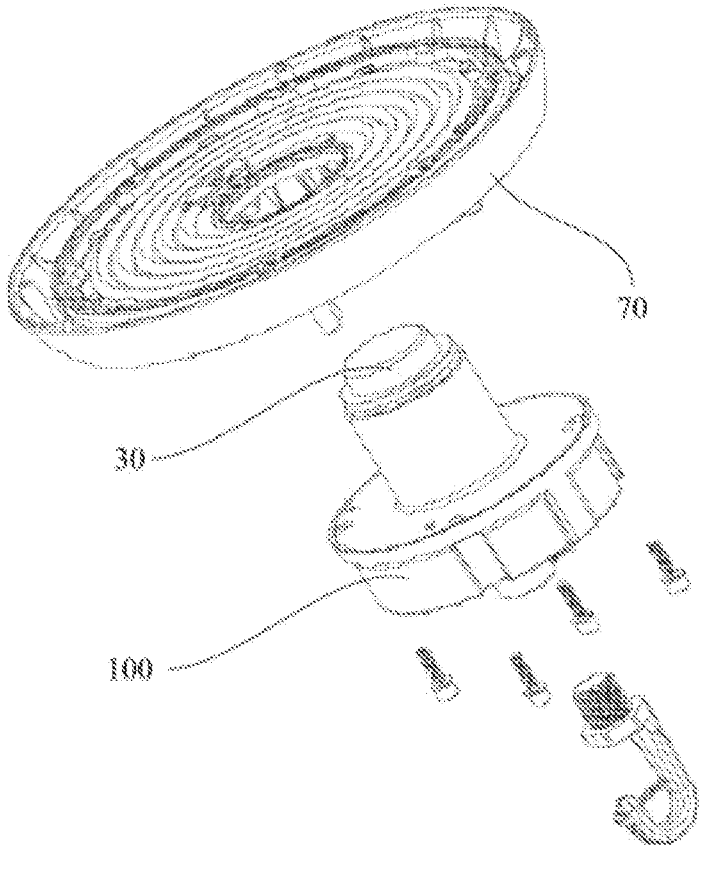
FIG. 8 is a structural schematic diagram of the lamp according to one embodiment of the present disclosure.
Figure 9:
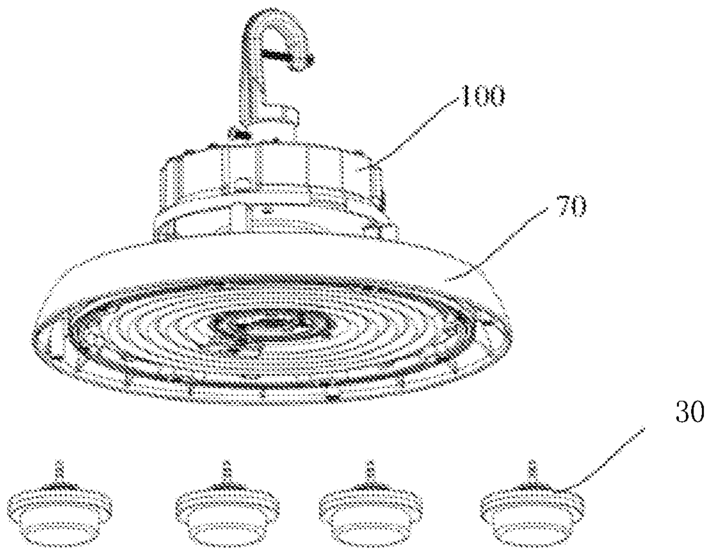
FIG. 9 is a structural schematic diagram of the lamp according to another embodiment of the present disclosure.

Referring to FIG. 8 and FIG. 9, the intelligent module 30 can be detachably electrically coupled to the at least one light, and the user can choose to install the intelligent module 30 or disassemble the intelligent module 30 according to the demand. When the intelligent module 30 is installed on the lamp 1000, the user can realize wireless control of the lamp 1000 through the intelligent module 30. When the intelligent module 30 is removed from the lamp 1000, the user can realize the control of the lamp 1000 through the wall switch, etc. The intelligent module 30 can be provided with different types of wireless communication circuits 36, such as one or a combination of WIFI, infrared transceiver module, ZigBee, Bluetooth, ZHAGA. Based on this these, the intelligent module 30 can realize the wireless connection with external devices, such as remote control, smart phone, smart watch, etc., and achieve networking with external devices. In practical applications, a space can have multiple lamps 1000, such as different rooms, etc. When each lamp 1000 is set with an intelligent module 30, the intelligent module 30 can also realize communication connection with the intelligent modules in other lamps (at this time the external device is a lamp), through which the intelligent module 30 can realize communication with other lamps to realize multiple lamps interconnection.

The intelligent module 30 can also be provided with microwave sensors, infrared human detection sensors, ambient light sensors, acoustic sensors, etc. Through these sensors, it can detect whether there is a user approaching in the space, whether there is user activity in the space, or detect the brightness of ambient light, and these sensors are electrically coupled to the power supply control board 20, and the power supply control board 20 can, according to the external environment signal detected by these sensors, control whether the light in the lamp body 70 works, adjust the light brightness, etc., to achieve single-point control of the lamp.

The invention by integrating the power color temperature control board 10, the power supply control board 20 and the intelligent module 30 in the lamp control box 100, by controlling the power color temperature control board 10 can achieve different power setting levels and different color temperature setting levels; the electrical connection between the intelligent module 30 and power supply control board 20 can be compatible with different intelligent modules 30, solving a problem of single function of the lamp 1000, to achieve a purpose of multi-functional integration. The detachable electrical connection between the lamp control box 100 and the at least one light of the present disclosure can be applied to different lamp bodies 70, and the different electric power can be adjusted according to different lamp bodies 70, which can improve the compatibility between the lamp control box 100 and different lamp bodies 70. The lamp control box 100 of the present disclosure can be widely used in different lamp drives.

It can be understood that the present disclosure by setting the at least one light and the intelligent module 30 for realizing wireless communication, and the intelligent module 30 and the at least one light can be detachably coupled electrically, the intelligent module 30 of the present disclosure can be assembled to the lamp 1000 or disassembled from the lamp 1000 according to the actual application requirements, and the type of the intelligent module 30 can be replaced, the present disclosure solves a problem that wireless control cannot be realized when the intelligent module 30 is not set on the lamp 1000, and the present disclosure also solves a problem that the intelligent module 30 is fixed on the lamp 1000 and cannot be replaced arbitrarily. The present disclosure improves the convenience of the use of the lamp 1000.

Figure 10:
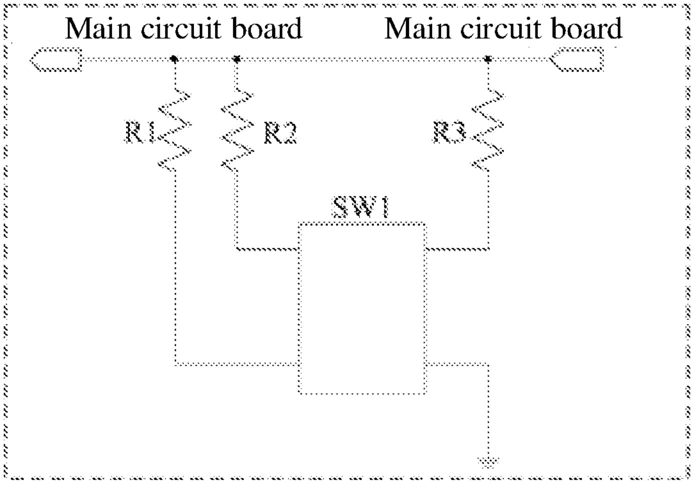
FIG. 10 is a circuit schematic diagram of a power color temperature control board of the lamp according to one embodiment of the present disclosure.
Figure 11:
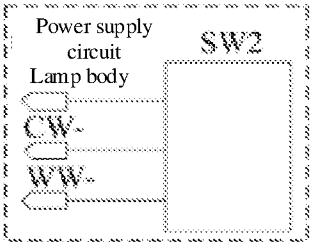
FIG. 11 is a circuit schematic diagram of a power color temperature control board of the lamp according to one embodiment of the present disclosure.
Figure 12:
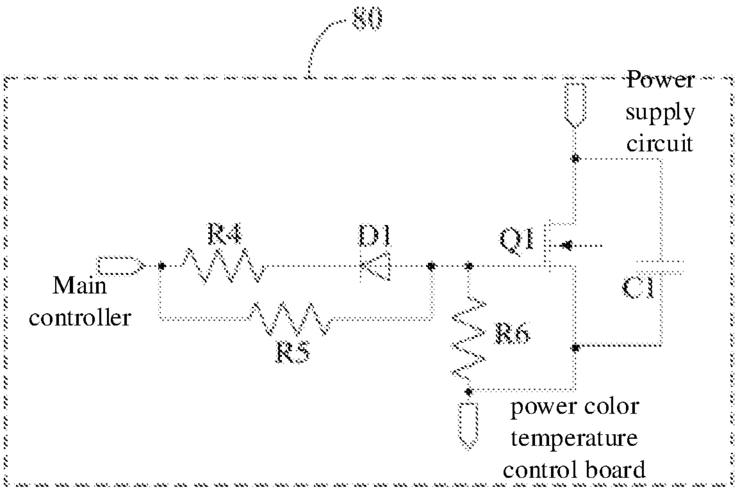
FIG. 12 is a circuit schematic diagram of an LED control circuit on the power supply control board according to one embodiment of the present disclosure.

Referring to FIGS. 10 to 12, in one embodiment, the power supply control board 20 includes a power supply circuit; the at least one light includes: a first color temperature lamp bead WW− and a second color temperature lamp bead CW−.

The power color temperature control board 10 includes the first circuit board 11, a first resistor R1, a second resistor R2, a third resistor R3, the power setting dip switch SW1 and the color temperature setting dip switch SW2. The first resistor R1, the second resistor R2, the third resistor R3, the power setting dip switch SW1 and the color temperature setting dip switch SW2 are respectively located on the first circuit board 11. A first end of the first resistor R1, a first end of the second resistor R2 and a first end of the third resistor R3 are respectively coupled to the power supply control board 20. A second end of the first resistor R1 is coupled to a first end of the power setting dip switch SW1. A second end of the second resistor R2 is coupled to a second end of the power setting dip switch SW1. A second end of the third resistor R3 is coupled to the third end of the power setting dip switch SW1. A fourth end of the power setting dip switch SW1 is grounded.

A first end of the color temperature setting dip switch SW2 is coupled to the first color temperature lamp bead WW−, a second end of the color temperature setting dip switch SW2 is coupled to the second color temperature lamp bead CW−, and a third end of the color temperature setting dip switch SW2 is coupled to the power supply circuit and at least one light of the lamp body 70.

In this embodiment, the first resistor R1, the second resistor R2 and the third resistor R3 are sampling resistors. When the power setting dip switch SW1 is switched to a high power level, the first end, the second end and the third end of the power setting dip switch SW1 are turned on, a total resistance value of the three sampling resistors is low, and the first circuit board 11 outputs the corresponding electrical signal, i.e., the high power level trigger signal to the power supply control board 20. When the power setting dip switch SW1 is switched to a medium power level, the first and second ends of the power setting dip switch SW1 are turned on, the total resistance value of the three sampling resistors is medium, and the first circuit board 11 outputs the corresponding electrical signal, i.e., the medium power level trigger signal to the power supply control board 20. When the power setting dip switch SW1 is switched to a low power level, the first end of the power setting dip switch SW1 is turned on, the total resistance value of the three sampling resistors is higher, and the first circuit board 11 outputs the corresponding electrical signal, that is, the low power level trigger signal to the power supply control board 20.

It can be understood that when the control color temperature setting dip switch SW2 switches to the first color temperature level, the first end of the color temperature setting dip switch SW2 conducts and outputs the corresponding voltage signal, i.e., the first color temperature signal to the first color temperature light bead WW−, and the first color temperature light bead WW− is lit after receiving the first color temperature signal; when the control color temperature dip switch SW2 is switched to the second color temperature position level, the second end of the control color temperature dip switch SW2 conducts and outputs the corresponding voltage signal, i.e., the second color temperature signal to the second color temperature bead CW−; and the second color temperature bead CW− is lit after receiving the second color temperature signal; when the control color temperature dip switch SW2 is switched to a no color temperature level, there is no port on, no voltage signal, that is, the color temperature signal is output to any of the lamp beads, no lamp beads are lit. The function of adjustable color temperature can be adjusted by controlling the color temperature setting dip switch SW2.

This embodiment realizes the function of adjustable power level by controlling the power setting dip switch SW1 to switch to different power levels and output the corresponding power signals to the power supply control board 20; the function of adjustable color temperature is realized by controlling the color temperature setting dip switch SW2 to switch to different color temperature levels and output the color temperature signal to the corresponding color temperature lamp beads.

As shown in FIGS. 1 and 12, in one embodiment, the power supply control board 20 includes a lamp control circuit 80 and a power supply circuit. The output of the lamp control circuit 80 is coupled to the at least one light. The lamp control circuit 80 is configured to control the operation of the at least one light in accordance with the power level trigger signal or the control signal sent by the external device. The output of the power supply circuit is coupled to the power color temperature control board 10, the lamp control circuit 80, the intelligent module 30 and the at least one light respectively. The power supply circuit is configured to provide a stable operating voltage to the power color temperature control board 10, the lamp control circuit 80, the intelligent module 30 and the at least one light.

In this embodiment, the output of the lamp control circuit 80 is coupled to the at least one light, the lamp control circuit 80 receives the power level trigger signal from the power color temperature control board 10 and outputs the corresponding power supply power to the at least one light. The lamp control circuit 80 receives the control signal sent from the external device and outputs the corresponding control signal to control the work of the at least one light.

It can be understood that the power supply circuit is configured to convert AC power to stable DC power, so as to provide a stable operating voltage to the power color temperature control board 10, the lamp control circuit 80, the intelligent module 30 and the at least one light.

Referring to FIG. 12, in one embodiment, the lamp control circuit 80 includes a main controller, a fourth resistor R4, a fifth resistor R5, a sixth resistor R6, a first diode D1, a first capacitor C1 and a first electronic switch Q1. The first end of the fourth resistor R4 and the first end of the fifth resistor R5 are coupled to the main controller. The second end of the fourth resistor R4 is interconnected with the first end of the first diode D1. The second end of the fifth resistor R5 is interconnected with the first diode D1. The first end of the sixth resistor R6 and the first end of the first electronic switch Q1 are interconnected. The second end of the sixth resistor R6 is coupled to the second end of the first electronic switch Q1 and the power color temperature control board 10. The third end of the first electronic switch Q1 is coupled to the power supply circuit.

In this embodiment, the fourth resistor R4 and the fifth resistor R5 play a role of current limiting and are configured to protect the circuit. The sixth resistor R6 can play a role of a pull-down resistor. When the first electronic switch Q1 is conducted, the sixth resistor R6 is configured to pull down [the] a level of a controlled end of the first electronic switch Q1 to be a low level. The first diode D1 plays a role of absorbing a counter-peak pulse current and is configured to protect the circuit. The first capacitor C1 is configured to eliminate spikes caused by a switch and play a protective role. It can be understood that the main controller receives the corresponding power level trigger signal from the first circuit board and outputs the corresponding PWM signal to the first electronic switch Q1, the conduction time of the first electronic switch Q1 will change. The main controller outputs the PWM signal with high duty cycle after receiving the trigger signal of high power level, so that the conduction time of the first electronic switch Q1 is long, the output current is large, the electric power output by the power supply is high. After the main controller receives the trigger signal of medium power level, it will output PWM signal with medium duty cycle, so that the conduction time of the first electronic switch Q1 is medium, the output current is medium-output current and the output power output by the power supply is medium. After the main controller receives the trigger signal of low power level, it will output PWM signal with low duty cycle, so that the conduction time of the first electronic switch Q1 is short, the current output is low, and the electric power output by the power supply is low.

In this embodiment, the main controller outputs the corresponding PWM signal according to the received power signal and controls the conduction time of the electronic switch so as to adjust the power level.

As shown in FIG. 9, in one embodiment, the intelligent module 30 is pluggable and electrically coupled to the power supply control board 20.

In this embodiment, the intelligent module 30 and the power supply control board 20 are pluggable and electrically connected. When the intelligent module 30 is needed to control, the intelligent module 30 will be inserted into the power supply control board 20 so as to achieve electrical connection to control the at least one light. When another intelligent module 30 is needed to control, the previous intelligent module 30 can be unplugged and a new intelligent module 30 is inserted to control the at least one light. The present embodiment achieves a function of being compatible with the control of multiple intelligent modules 30, and the intelligent module 30 is pluggable and electrically coupled to the power supply control board 20, and also enables quick assembly and replacement of the intelligent module 30 with the power supply control board 10, improving the convenience and compatibility of the use of the lamp 1000.

As shown in FIGS. 4 and 5, in one embodiment, the intelligent module 20 has a conductive plug post 34, the power supply control board 20 has a conductive plughole; the conductive plug post 34 is plugged and coupled to the conductive plughole so that the intelligent module 30 and the power supply control board 20 are removably and electrically coupled to each other.

The power color temperature control board 10 includes a fixed post, the power supply control board 20 defines a plughole.

The conductive plug post 34 passes through the fixed post and is electrically coupled in the plughole.

In this embodiment, the electrical connector on the intelligent module 30 is the conductive plug post 34, the power color temperature control board 10 is provided with a fixed post, the power supply control board 20 defines a plughole, the conductive plug post 34 of the intelligent module 30 passes through the fixed post of power color temperature control board 10 is inserted into the plughole of the power supply control board 20, the electrical connection between the intelligent module 30 and the power supply control board 20 can be achieved. In this embodiment, the conductive plug post 34 can be realized by using a headphone plug to realize the electrical connection between the intelligent module 30 and the power supply control board 20, which is convenient to install and replace, and can realize the quick installation of the intelligent module 30.

As shown in FIG. 6, in one embodiment, the intelligent module 30 further includes a bottom base 32. The bottom base 32 of the intelligent module defines a groove 321. The second circuit board 31 is accommodated within the groove 321 and secured by screws.

As shown in FIGS. 1 to 11, in one embodiment, the lamp control box 100 includes a box 101. The power color temperature control board 10, the power supply control board 20 and the intelligent module 30 are received in the box 101.

In this embodiment, the power color temperature control board 10 is fixed by screws in an upper part of the box 101; the power supply control board 20 is fixed by screws in a lower part of the box 101; the intelligent module 30 is fixed in the top of the box 101; the intelligent module 30 is removable for replacement, according to the user's needs. Different intelligent modules 30 or no intelligent module 30 can be selected to install in the box 101. A waterproof cover 60 is installed on the top of the box 101 to prevent water ingress. Thereby, the lamp control box 100 as a whole can achieve IP65 waterproof level.

As shown in FIGS. 1 to 11, in one embodiment, the box 101 includes a power supply box 1011 and a bottom housing 1013. The power supply control board 20 is located within the power supply box 1011. The power supply box 1011 defines an opening 1012. The bottom housing 1013 is covered on the opening 1012 of the power supply box 1011. The bottom housing 1013 also defines a receiving space 1014. The power color temperature control board 10 and the intelligent module 30 are received in the receiving space 1014 of the bottom housing 1013.

In this embodiment, the upper part of the box 101 is the bottom housing 1013, the lower part of the box 101 is the power supply box 1011, the power supply control board 20 is fixed in the power supply box 1011 by screws, the power color temperature control board 10 is fixed in the receiving space 1014 of the bottom housing 1013 by screws, and the intelligent module 30 is fixed in the top of the receiving space 1014.

As shown in FIG. 2, in one embodiment, the bottom housing 1013 is further provided with an annular support part, and the bottom wall of the bottom base 32 further includes a threaded fixing portion 33 for the intelligent module 30 to be threadedly coupled to the annular support part 40 of the bottom housing 1013.

In this embodiment, the bottom wall of the intelligent module 30 is convexly provided with the threaded fixing portion 33; the bottom housing 1013 of the box 101 is provided with the annular support part 40, and the threaded fixing portion 33 of the intelligent module 30 is placed in the annular support part 40 of the bottom housing 1013 of the box 101, and the annular support part 40 is suitably provided with threads, and then twisted to complete the connection of the intelligent module 30 to the box 101. The intelligent module 30 is coupled to the box 101. The intelligent module 30 is threaded to the annular support part 40 in the box 101 through the threaded fixing portion 33, which can achieve a quick connection between the intelligent module 30 and the at least one light of the lamp 1000.

As shown in FIG. 9, in one embodiment, the number of the intelligent modules 30 are multiple. The multiple intelligent modules 30 are capable of achieving pluggable and electrically connected to the power supply control board 20.

In this embodiment, each intelligent module 30 can be provided with a different type of wireless communication circuit, such as one or a combination of WIFI, infrared transceiver module, ZigBee, Bluetooth. The intelligent module 30 can also be provided with microwave sensors, infrared body detection sensors, ambient light sensors, and so on. The number of wireless communication circuits 36 and the number of the sensors 37 provided on each intelligent module 30 can be different and can be a combination of wireless communication circuits 36 and sensors 37, for example, some intelligent modules 30 can be provided with only wireless communication circuits 36, such as Bluetooth modules and/or WIFI, some intelligent modules 30 can be provided with only sensors 37, such as infrared body detection sensors, and some intelligent module 30 can be provided with both wireless communication circuits 36 and sensors 37, and the user can select the corresponding intelligent module 30 according to the needs of the actual application and install the intelligent module 30 that meets the user's needs to the power supply control board 20.

In one embodiment, the conductive plughole of the power supply control board 20 is a 12V intelligent interface, and the intelligent module 30 achieves a pluggable electrical connection to the power supply control board 20 through the intelligent interface. In other embodiments, the intelligent interface is not limited to 12V, but may also be other voltages.

In some embodiments, the intelligent interface, the power setting dip switch SW1 and the color temperature setting dip switch SW2 are located on the annular support part 40. When the intelligent module 30 is plugged into the intelligent interface, the intelligent module 30 covers the power setting dip switch SW1 and color temperature setting dip switch SW2. Therefore, the intelligent module 30 needs to be removed when color temperature and power need to be adjusted.

In some embodiments, the intelligent interface is provided on the annular support part 40, and the intelligent module 30 is plugged into the intelligent interface. The power setting dip switch SW1 and color temperature setting dip switch SW2 are provided on a side wall of power supply box 1011.

In some embodiments, the intelligent interface may be omitted, and thus, the intelligent module 30 may be omitted. The power setting dip switch SW1 and color temperature setting dip switch SW2 are provided on a side wall of the power supply box 1011.

In some embodiments, the power supply box 1011 may be cylindrical or square. Therefore, the power supply for the lamp 1000 can be a cylindrical power supply or a square power supply.

The above mentioned is only a preferred embodiment of the present disclosure, not to limit the patent scope of the present disclosure for this reason. All equivalent structural transformations made under the inventive concept of the present disclosure using the contents of the specification and the accompanying drawings of the present disclosure, or directly/indirectly applied in other related technical fields are included in the patent protection scope of the present disclosure.

What is claimed is:

1. A lamp control box for a lamp, applied to the lamp comprising a lamp body, the lamp body comprising at least one light, wherein, the lamp control box comprises:

a power color temperature control board, electrically coupled to the at least one light, having a plurality of power setting levels and a plurality of color temperature setting levels; and a power supply control board, electrically coupled to the at least one light and the power color temperature control board respectively;

wherein the power color temperature control board is configured for generating a corresponding power level trigger signal in response to one of the plurality of power setting levels being selected and triggered by a user; the power supply control board is configured for receiving power output from the lamp, and adjusting power level of the power in response to the power level trigger signal and outputting the adjusted power to the at least one light;

wherein the power color temperature control board is further configured for adjusting color temperature of the at least one light according to one of the plurality of the color temperature setting levels being selected and triggered by the user;

wherein the lamp control box further comprises an intelligent module electrically coupled to the power supply control board; the intelligent module is configured to achieve wireless communication between an external device and the power supply control board, and enable the power supply control board to control the at least one light to work according to control signals sent by the external device; the intelligent module is also configured to collect external environmental signals and enable the power supply control board to control the at least one light to work according to the external environmental signals;

wherein the lamp control box comprises a box;

wherein the box comprises:

a power supply box, the power supply box defining a hollow space and defining an opening formed at one end in a height direction of the box and interconnected with the hollow space;

a bottom housing, comprising a ring flat plate part and a cylindrical support part, wherein the power supply box, the ring flat plate part and the cylindrical support part are arranged along the height direction of the box; the ring flat plate part is covered on the opening of the power supply box, the cylindrical support part protrudes from the ring flat plate part to a side far away from the power supply box, an external diameter of the power supply box is greater than an external diameter of the cylindrical support part, an outer edge of the ring flat plate part is connected to an end of the power supply box close to the cylindrical support part, an inner edge of the ring flat plate part is connected to one end of the cylindrical support part close to the power supply box, the cylindrical support part defines a receiving space which is interconnected with the opening;

wherein the power supply control board is received in the hollow space of the power supply box, the power color temperature control board and the intelligent module are received in the receiving space.

2. The lamp control box according to claim 1, wherein the power color temperature control board comprises:

a first circuit board;

a power setting dip switch set on the first circuit board and coupled to the power supply control board, the power setting dip switch being configured to generate the corresponding power level trigger signal of the corresponding level when triggered by the user to adjust the power level output to the at least one light;

a color temperature setting dip switch set on the first circuit board and coupled to the power supply control board, the color temperature setting dip switch being configured to adjust color temperature of the at least one light to the corresponding color temperature according to the color temperature level selected and triggered by the user.

3. The lamp control box according to claim 2, wherein the power color temperature control board comprises a first resistor, a second resistor, and a third resistor; the first resistor, the second resistor and the third resistor are respectively coupled to a first end, a second end and a third end of the power setting dip switch, and a fourth end of the power setting dip switch is grounded;

when the power setting dip switch is switched to a high power level, the first, second and third ends of the power setting dip switch are turned on, the power color temperature control board outputs a high power level trigger signal to the power supply control board;

when the power setting dip switch is switched to a medium power level, the first and second ends of the power setting dip switch are turned on, the power color temperature control board outputs a corresponding medium power level trigger signal to the power supply control board;

when the power setting dip switch is switched to a low power level, the first end of the power setting dip switch is turned on, the power color temperature control board outputs a low power level trigger signal to the power supply control board.

4. The lamp control box according to claim 3, wherein at least one light comprises: a first color temperature lamp bead and a second color temperature lamp bead;

a first end of the color temperature setting dip switch is coupled to the first color temperature lamp bead, a second end of the color temperature setting dip switch is coupled to the second color temperature lamp bead, and a third end of the color temperature setting dip switch SW2 is coupled to a power supply circuit of the power supply control board and the at least one light;

when the control color temperature setting dip switch switches to the first color temperature level, the first end of the color temperature setting dip switch conducts and outputs a first color temperature signal to the first color temperature light bead;

when the control color temperature dip switch is switched to the second color temperature level, the second end of the control color temperature dip switch conducts and outputs a second color temperature signal to the second color temperature bead;

when the control color temperature dip switch is switched to a no color temperature level, no lamp beads are lit.

5. The lamp control box according to claim 2, wherein at least one light comprises: a first color temperature lamp bead and a second color temperature lamp bead;

a first end of the color temperature setting dip switch is coupled to the first color temperature lamp bead, a second end of the color temperature setting dip switch is coupled to the second color temperature lamp bead, and a third end of the color temperature setting dip switch SW2 is coupled to a power supply circuit of the power supply control board and the at least one light;

when the control color temperature setting dip switch switches to the first color temperature level, the first end of the color temperature setting dip switch conducts and outputs a first color temperature signal to the first color temperature light bead;

when the control color temperature dip switch is switched to the second color temperature level, the second end of the control color temperature dip switch conducts and outputs a second color temperature signal to the second color temperature bead;

when the control color temperature dip switch is switched to a no color temperature level, no lamp beads are lit.

6. The lamp control box according to claim 1, wherein the intelligent module is pluggable electrically coupled to the power supply control board.

7. The lamp control box as according to claim 6, wherein the intelligent module comprises a conductive plug; the power supply control board defines a conductive plughole; the conductive plug is plugged into and coupled to the conductive plughole so that the intelligent module and the power supply control board are removably and electrically coupled to each other.

8. The lamp control box as according to claim 6, wherein the intelligent module comprises:

a second circuit board, the second circuit board being further provided with an electrical connector;

a wireless communication circuit, provided on the second circuit board, the wireless communication circuit being electrically coupled to the power supply control board through the electrical connector; and/or a sensor, provided on the second circuit board, the sensor being electrically coupled to the power supply control board through the electrical connector.

9. The lamp control box according to claim 8, wherein the intelligent module further comprises: a bottom case; the bottom case defines a groove; the second circuit board is accommodated in the groove.

10. The lamp control box according to claim 9, wherein a bottom wall of the bottom case is further convexly provided with a threaded fixing portion for the intelligent module to be threadedly coupled to the cylindrical support part of the bottom housing.

11. The lamp control box according to claim 9, wherein the intelligent module comprises a conductive plug post; the power supply control board defines a conductive plughole; the conductive plughole is coupled to the cylindrical support part; the conductive plug post is plugged and coupled to the conductive plughole so that the intelligent module and the power supply control board are detachably coupled and electrically coupled to each other.

12. The lamp control box according to claim 11, wherein the power color temperature control board comprises a power setting dip switch and a color temperature setting dip switch; the conductive plughole is an intelligent interface attached to the annular support part; the intelligent interface, the power setting dip switch and the color temperature setting dip switch are located on the annular support part.

13. The lamp control box according to claim 11, wherein the power color temperature control board comprises a power setting dip switch and a color temperature setting dip switch; the conductive plughole is an intelligent interface attached to the cylindrical support part; the intelligent interface is set on the cylindrical support part; the power setting dip switch and color temperature setting dip switch are set on a side wall of the power supply box.

14. The lamp control box according to claim 1, wherein the power color temperature control board comprises a power setting dip switch and a color temperature setting dip switch; the power setting dip switch and the color temperature setting dip switch are set on a side wall of the power supply box.

15. The lamp control box according to claim 1, wherein the power supply box has a cylindrical shape or a square shape.

16. The lamp control box according to claim 1, wherein the number of the intelligent modules is multiple, and multiple intelligent modules are pluggable and electrically connected to the power supply control board.

17. A lamp, wherein the lamp comprises a lamp body and a lamp control box according to claim 1; the lamp body comprises at least one light, the lamp control box is electrically coupled to the at least one light.

18. The lamp control box according to claim 1, wherein the power supply control board comprises a lamp control circuit and a power supply circuit; the lamp control circuit is coupled to the at least one light, the lamp control circuit is configured to control the at least one light in accordance with the power level trigger signal or the control signal sent by the external device; the power supply circuit is coupled to the power color temperature control board, the lamp control circuit, the intelligent module and the at least one light respectively.

19. The lamp control box according to claim 18, wherein the lamp control circuit comprises a main controller, a fourth resistor, a fifth resistor, a sixth resistor, a first diode, a first capacitor and a first electronic switch, a first end of the fourth resistor and a first end of the fifth resistor are coupled to the main controller; a second end of the fourth resistor is coupled to a first end of the first diode, a second end of the fifth resistor, a second end of the first diode D1, a first end of the sixth resistor and a first end of the first electronic switch are connected; a second end of the sixth resistor is coupled to a second end of the first electronic switch and the power color temperature control board; a third end of the first electronic switch is coupled to the power supply circuit.

* * * * *